US008494524B2

(12) United States Patent  
Wu

(10) Patent No.: US 8,494,524 B2
(45) Date of Patent: Jul. 23, 2013

(54) METHOD FOR COLLECTING INTERFERENCE STATUS INFORMATION OF SUBSCRIBER STATION BY COEXISTENCE BASE STATION

(75) Inventor: Xuyong Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 1247 days.

(21) Appl. No.: 12/040,618

(22) Filed: Feb. 29, 2008

(65) Prior Publication Data

US 2008/0146227 A1 Jun. 19, 2008

Related U.S. Application Data

(63) Continuation of application No. PCT/CN2006/002254, filed on Sep. 1, 2006.

(30) Foreign Application Priority Data

Sep. 2, 2005 (CN) .......................... 2005 1 0098834

(51) Int. Cl.
*H04W 36/00* (2009.01)
*H04B 1/04* (2006.01)

(52) U.S. Cl.
USPC ............ 455/436; 455/114.2; 455/278.1; 455/296

(58) Field of Classification Search
USPC ............ 455/63.1–63.4, 436–444, 114.2, 455/278.1, 296; 370/328–338
See application file for complete search history.

(56) References Cited

U.S. PATENT DOCUMENTS

| 6,130,886 A | 10/2000 | Ketseoglou et al. |
| 6,643,414 B1 | 11/2003 | Kadono |
| 6,865,167 B2 * | 3/2005 | Famolari et al. ............. 370/331 |

(Continued)

FOREIGN PATENT DOCUMENTS

| CN | 1319962 A | 10/2001 |
| CN | 1391414 A | 1/2003 |

(Continued)

OTHER PUBLICATIONS

PCT Written Opinion of the International Searching Authority (Dec. 28, 2006).
European Office Action (Apr. 14, 2009).
European Office Action (Nov. 20, 2009).

(Continued)

*Primary Examiner* — Wesley Kim
(74) *Attorney, Agent, or Firm* — Conley Rose, P.C.; Grant Randolph

(57) ABSTRACT

A method and a system for collecting interference status information of a subscriber station by a coexistence base station includes: during an initialization process of a neighbor base station, after a broadcast contact message containing contact information received from the neighbor base station, a subscriber station in an overlapping area of the neighbor base station and a coexistence base station sending a report message to the coexistence base station, wherein the report massage comprises interference status information of the subscriber station, and the coexistence base station is a serving base station of the subscriber station; and collecting and saving, by the coexistence base station, the interference status information of the subscriber station according to the report message. By the present invention, the coexistence base station may collect the interference status information of all subordinate subscriber stations in time during the initialization process of a neighbor base station, and update and save the collected information in a coexistence database.

16 Claims, 4 Drawing Sheets

U.S. PATENT DOCUMENTS

| | | | |
|---|---|---|---|
| 2003/0003906 A1* | 1/2003 | Demers et al. | 455/424 |
| 2004/0072571 A1 | 4/2004 | Halonen et al. | |
| 2008/0132233 A1 | 6/2008 | Li et al. | |

FOREIGN PATENT DOCUMENTS

| | | |
|---|---|---|
| CN | 1481650 A | 3/2004 |
| CN | 1610272 A | 4/2005 |
| WO | WO 02/103920 A2 | 12/2002 |
| WO | 2004028062 A1 | 4/2004 |
| WO | WO 2005/043947 A1 | 5/2005 |

OTHER PUBLICATIONS

Foreign Communication From A Related Counterpart Application, PCT Application PCT/CN2006/001556, International Search Report dated Oct. 19, 2006, 3 pages.

Foreign Communication From A Related Counterpart Application, PCT Application PCT/CN2006/001556, Written Opinion dated Oct. 19, 2006, 3 pages.

Foreign Communication From A Related Counterpart Application, Chinese Application 200680012251.5, Office Action dated Apr. 8, 2011, 4 pages.

Foreign Communication From A Related Counterpart Application, Chinese Application 200680012251.5, Partial English Translation of Office Action dated Apr. 8, 2011, 1 page.

IEEE Std 802.16™, "IEEE Standard for Local and Metropolitan Area Networks, Part 16: Air Interface for Fixed Broadband Wireless Access Systems," IEEE Computer Society, Oct. 1, 2004, 893 pages.

IEEE 802.16-05/013, "Part 16: Air Interface for Fixed broadband Wireless Access Systems, Amendment for Improved Coexistence Mechanisms for License-Exempt Operation," IEEE Computer Society, Jun. 6, 2005, 57 pages.

IEEE 802.16h-05/014, "Call for Contributions, IEEE 802.16's License Exempt (LE) Task group," IEEE-SA Standards Board, Jun. 9, 2005, 1 page.

* cited by examiner

METHOD FOR COLLECTING INTERFERENCE STATUS INFORMATION OF SUBSCRIBER STATION BY COEXISTENCE BASE STATION

CROSS REFERENCE TO RELATED APPLICATION

This application is a continuation of International Patent Application No. PCT/CN2006/002254, filed Sep. 1, 2006, which claims priority to Chinese Patent Application No. 200510098834.1, filed Sep. 2, 2005, both of which are hereby incorporated by reference.

FIELD OF THE INVENTION

The present invention relates to the field of communications, in particular, to a method for collecting interference status information of a subscriber station by a coexistence base station.

BACKGROUND OF THE INVENTION

Broadband Wireless Access (BWA) devices may provide a convenient broadband access mode to users. At present, there are BWA devices based on private protocols and BWA devices based on standard protocols. BWA technology is developing rapidly presently. The technology for developing broadband metropolitan area access using wireless resources has a strong vitality and a broad market space.

Wireless spectrum resources are very precious. Especially for some areas not well planned or some license-free frequency bands, a plurality of base stations usually runs on the same channel. As a result, the signals of different base stations interfere with each other. Therefore, in order to coordinate the coexistence of each base station device under the same frequency band, especially, the coexistence of each base station device under license-free frequency bands, some coexistence mechanism among base station devices needs to be established.

In a coexistence base station system, it is usually required that the transceiving synchronization should be guaranteed among different base stations, in other words, it is required that the frame timing for sending and receiving a signal among different base stations should be aligned rigidly. Therefore, it may be ensured that the transceiving interference among stations near each other is avoided. For example, for base stations BS1 and BS2 in FIG. 1, if BS2 is receiving signals when BS1 is sending signals, severe interference will be laid by BS1 to BS2 on the receiving of signals from subordinate subscriber stations of BS2.

The basic structure of the coexistence base station is as shown in FIG. 2, including three parts: a wireless functional part, a wired functional part and a coexistence functional part (including a coexistence database). Each of the coexistence functional part and the other two parts has an interface. The wired functional part is connected to a wired core network or an access network, and is responsible for the transceiving and processing related to the wired communication. The wireless functional part is connected to an air interface, and is responsible for the transceiving and processing of the wireless communication. The wired functional part and the wireless functional part are in communication with each other.

The base station has two states, i.e., a normal working state and a starting initialization state. In a coexistence base station system, the base station is usually connected to a core network via a wired path, and may be communicated with the core network via a wire.

By taking the coexistence base station network shown in FIG. 3 as an example, the initialization process of a base station near several base stations in normal working state will now be discussed.

To better describe the corresponding background technology, the definition of a neighbor station will be introduced first. The neighbor station refers to base stations with a common coverage area having effective subscriber stations. For example, in the network shown in FIG. 1, BS1 and BS2 are near each other geographically and lie in the coverage area of the other, but because there are no effective subscriber stations in the common coverage area of stations BS1 and BS2, stations BS1 and BS2 are not neighbor stations. However, although the overlapped coverage area of BS2 and BS3 is small and BS2 and BS3 do not lie in the coverage area of the other, there are effective subscriber stations in the overlapped coverage area and interference will be laid to the wireless network of the other party, BS2 and BS3 are referred to as neighbor stations.

In FIG. 3, there are a plurality of base stations near starting base station SBS1, such as WBS1, WBS2, WBS3 and WBS4. Subscriber stations A and B exist in the common coverage area of WBS1 and SBS1, subscriber station C exists in the common coverage area of WBS2 and SBS1, and subscriber station D exists in the common coverage area of WBS3 and SBS1. Therefore, WBS1, WBS2, WBS3 and SBS1 are neighbor stations. Subscriber station G locates in the overlapped part of the coverage areas of base stations WBS1 and WBS2. Other subscriber stations E/F/H/I/J/K do not lie in the overlap area of base stations.

During the starting process or the periodic broadcasting process, a base station needs to broadcast an IP address or other equivalent contact address to all subscriber stations in the coverage area of the base station, and a subscriber station in the coverage area of the base station forwards obtained address information to a working base station to which the subscriber station pertains. After the working base station obtains the address information, the base station may be found on the wired network.

To solve the problem of coexistence base stations, neighbor stations need to negotiate with each other. When air interface resources are allocated, a base station will send data to subscriber stations in interference-free area using competitive air interface resources (such as time period and subchannel), and send data to subscriber stations in interfered area using dedicated air interface resources (such as time period and subchannel).

Therefore, to effectively use the air interface resources, an operating base station needs to know the interference status of subscriber stations of the operating base station all the time, and needs to know whether each subscriber station is interfered and by which base station the subscriber station is interfered. Moreover, when a new neighbor station nearby is started, the base station updates the interference status information of known subscriber stations.

A method for collecting interference status information of a subscriber station by a coexistence base station in the prior art is as follows. After a neighbor base station is started, the original working base station queries the interference status information of subordinate subscriber stations of the original working base station continuously. If interfered information of a subscriber station is detected, it is indicated that the subscriber station is interfered by the neighbor station.

The disadvantage of this method lies in that, the base station to which the subscriber station pertains is unable to determine which neighbor station the subscriber station is interfered by. Therefore, the base station is unable to optimize the resource configuration according to the obtained interference status information of the subscriber station. For example, in FIG. 3, WBS1 finds that subscriber station G is interfered, but is unable to determine which neighbor station subscriber station G is interfered by. The query mode employed in the method adds the communication flow on the air interface, and the establishment and update of the database for saving the interference status information of a subscriber station in the base station is not timely enough.

Another method for collecting interference status information of a subscriber station by a coexistence base station in the prior art is as follows. After a new base station is started, the base station goes into a normal working state and establishes a contact with a neighbor station, then the neighbor station requires the subscriber station of the neighbor station to perform an interference detection, therefore a mutual interference relationship is determined.

This method has the following disadvantages:

1. When a base station does not negotiate with a neighbor station, there are no other signals on the air interface for the subscriber stations in the coverage area of the base station to perform a test and identification. Therefore, if the base station transmits a signal on an air interface, the normal communication of the neighbor station may have been interfered.

2. The measurement and detection approach for dedicated air interfaces is not used within the base station's initialization phase in this method, and when other messages or signals defined to perform the interference test on the subscriber station, the system may be more complex, and the processing time may be longer and be less timely.

SUMMARY OF THE INVENTION

The present invention is to provide a method for collecting interference status information of a subscriber station by a coexistence base station, so that the coexistence base station may collect the interference status information of all subordinate subscriber stations in time.

The present invention provides the following technical solutions.

The present invention provides a method for collecting interference status information of a subscriber station by a coexistence base station, including:

during an initialization process of a neighbor station, after the subscriber station in an overlap area of the neighbor station receives a broadcast contact message from the neighbor station, sending, by the subscriber station, a report message carrying interference status information of the subscriber station, to a coexistence base station to which the subscriber station pertains; and collecting and saving, by the coexistence base station, the interference status information of the subscriber station according to the report message received.

The process for sending the report message carrying the interference status information of the subscriber station specifically includes:

during the initialization process or an initialization and periodic broadcasting process of the neighbor station, broadcasting, by the neighbor station, a contact message comprising contact information of the neighbor station, to a subscriber station of a neighbor system in a coverage area of the neighbor station via an air interface; and after the subscriber station of the neighbor system receives the contact message, forming, by the subscriber station, the report message with received contact information of a newly started neighbor station and the interference status information of the subscriber station, and sending the report message to the coexistence base station to which the subscriber station pertains.

The contact information includes unique identifier information of the neighbor station, and the identifier information includes an IP address and a sector Identifier (ID) of the neighbor station.

The interference status information includes whether the subscriber station is interfered by the neighbor station; if it is determined that the subscriber station is interfered, the interference status information further includes the identifier information of an interference source.

Preferably, if it is determined that the subscriber station is interfered, the interference status information of the subscriber station includes level information of interference laid on the subscriber station by the neighbor station, and the level information is obtained according to a signal strength of a broadcast message received by the subscriber station from the neighbor station.

The process for collecting and saving the interference status information of the subscriber station specifically includes:

according to the report message received, collecting, by the coexistence base station, the interference status information of a reporting subscriber station, the identifier information of the reporting subscriber station and the contact information of the neighbor station, and saving collected information in a coexistence database according to a correlation.

The process for saving the collected information in the coexistence database according to the correlation includes:

indexing neighbor stations collected in the coexistence database, and updating the coexistence database according to the collected information.

The information saved in the coexistence database includes:

negotiation state information between an interference source neighbor station and the coexistence base station, wherein a state value of the negotiation state information includes Not Negotiated, In Negotiation, Negotiation Succeeded and Negotiation Failed.

After the coexistence base station collects and saves the contact information of the neighbor station, the method further includes:

sending a contact packet to the interference source neighbor station including the neighbor station; and after the interference source neighbor station receives the contact packet, returning, by the interference source neighbor station, a response message to the coexistence base station, and updating, by the coexistence base station, the coexistence database according to the response message received.

The contact packet includes: a contact address of the coexistence base station, and part or all of the interference status information of the subscriber station collected by the coexistence base station.

The part or all of the interference status information of the subscriber station collected by the coexistence station comprises access mode information of the interference status information in the coexistence database.

The process for returning the response message to the coexistence base station specifically includes:

returning, by the interference source neighbor station, the response message to the coexistence base station according to the contact address in the contact packet received, the response message comprising profile information of the interference source neighbor station and the unique identifier information except the contact address.

The profile information of the interference source neighbor station includes: a frame length, a working frequency range, a modulation mode and/or radio resource allocation information of the interference source neighbor station.

The present invention further provides a system for collecting interference status information of a subscriber station by a coexistence base station, including:

a broadcast message receiving and processing unit, configured in the subscriber station, adapted to receive a broadcast contact message of a neighbor station when the subscriber station lies in an overlap area of the neighbor station, and trigger a report message carrying the interference status information to be sent; and a coexistence data collecting unit, configured in the coexistence base station, adapted to collect and save the interference status information of the subscriber station according to a received report message carrying the interference status information.

The system further includes:

a contact information broadcasting unit, configured in the coexistence base station, adapted to broadcast contact information of the base station in the broadcast contact message to a subscriber station in a coverage area of the base station via an air interface during a starting process of the coexistence base station or during the starting process and a periodic broadcasting process of the coexistence base station.

The contact information broadcast by the contact information broadcasting unit includes unique identifier information of the neighbor station, and the identifier information includes an IP address and a sector ID of the neighbor station.

The coexistence data collecting unit includes:

a report message receiving unit, adapted to receive the report message carrying the interference status information, and trigger a contact packet sending and processing unit;

the contact packet sending and processing unit, adapted to send a contact packet to an interference source neighbor station;

a neighbor station information sending and processing unit, configured in the interference source neighbor station, adapted to return a response message carrying neighbor station information after receiving the contact packet; and a neighbor station information receiving and processing unit, adapted to receive the response message returned by the interference source neighbor station, and update a coexistence database according to the neighbor station information in a received response message.

It can be seen from the above technical solutions of the present invention that in comparison with the prior art, the present invention has the following advantages.

1. The update of the interference status information of the subscriber station is timely. When a neighbor base station is started, the subscriber station may report the interfered situation to the coexistence base station to which the subscriber station pertains in time when the SBS (Starting Base Station) searches for a neighbor station, so that coexistence base station may update the coexistence database in time. Moreover, when the interference status of the subscriber station is changed due to other reasons, the subscriber station may obtain the contact information of the base station via a periodic broadcasting message sent by the base station, so that the subscriber station may perform information interaction with the base station to update the coexistence data in the base station in time. Therefore, the base station may adjust the resource allocation for the air interface in time, and may prevent that the interference of the base station has bad affects on the communication.

2. The air interface resources of the network may be saved. The subscriber station reports the interfered situation to the base station to which the subscriber station pertains by using the packet message in the searching process for a neighbor station. In other words, the contact address of the neighbor base station and the interference status of the subscriber station are both reported with one sending process, so that the precious air interface resources may be saved.

3. The base station information is comprehensive. The interference status information of all related neighbor stations and subordinate subscriber stations is saved in the base station by using a database, and the database is updated in time. Therefore, it is convenient for the base station and all the neighbor stations to negotiate, schedule and configure the air interface resources.

4. The normal service transceiving of the air interface will not be influenced. In the method, the air interface may be compatible with the existing protocol framework, so that the normal service transceiving process on the air interface will not be influenced.

DETAILED DESCRIPTION OF THE EMBODIMENTS

The present invention provides a method and a system for collecting interference status information of a subscriber station by a coexistence base station. The core concept of the present invention lies in that: the subscriber station reports an interfered situation to the coexistence base station to which the subscriber station pertains in time when a starting base station (SBS) searches for a neighbor station, and the coexistence base station updates the coexistence database in time and adjusts the resource allocation to the air interface in time.

Figure 1:
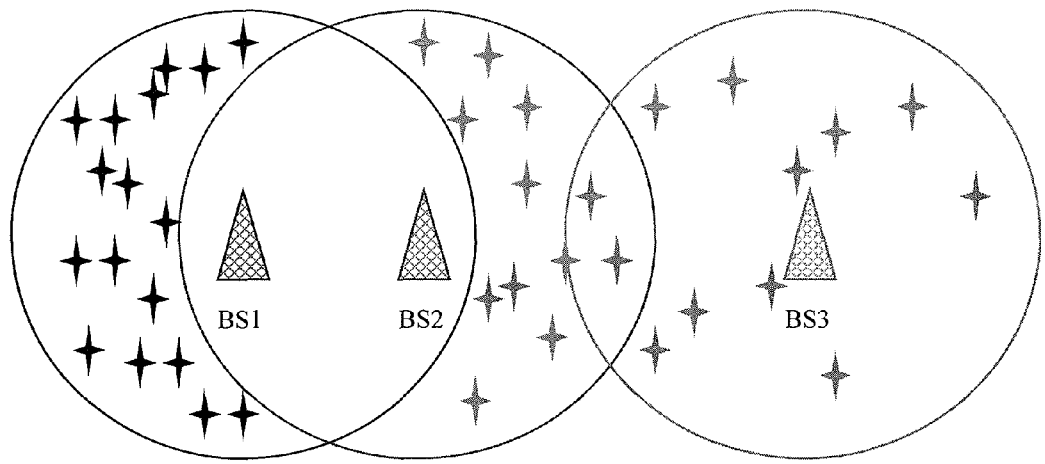
FIG. 1 is a schematic diagram showing neighbor stations.
Figure 2:
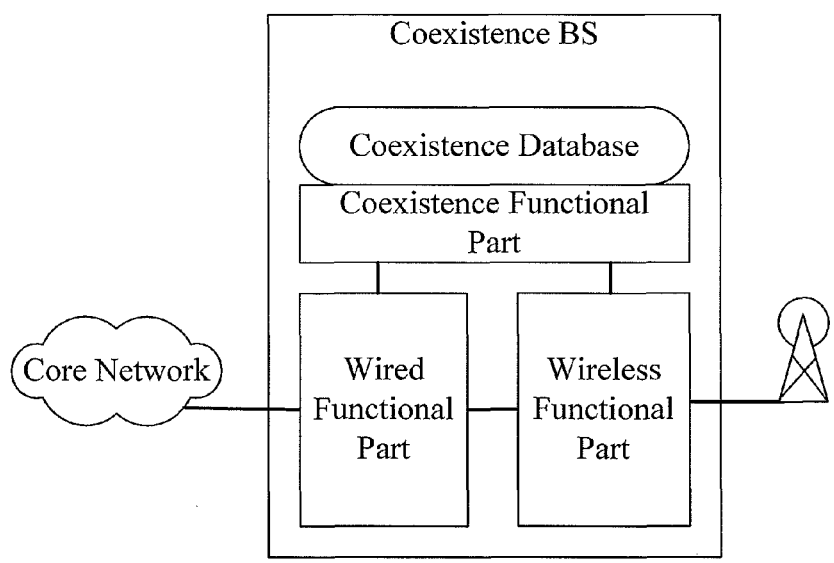
FIG. 2 is a schematic diagram showing a basic structure of a coexistence base station.
Figure 3:
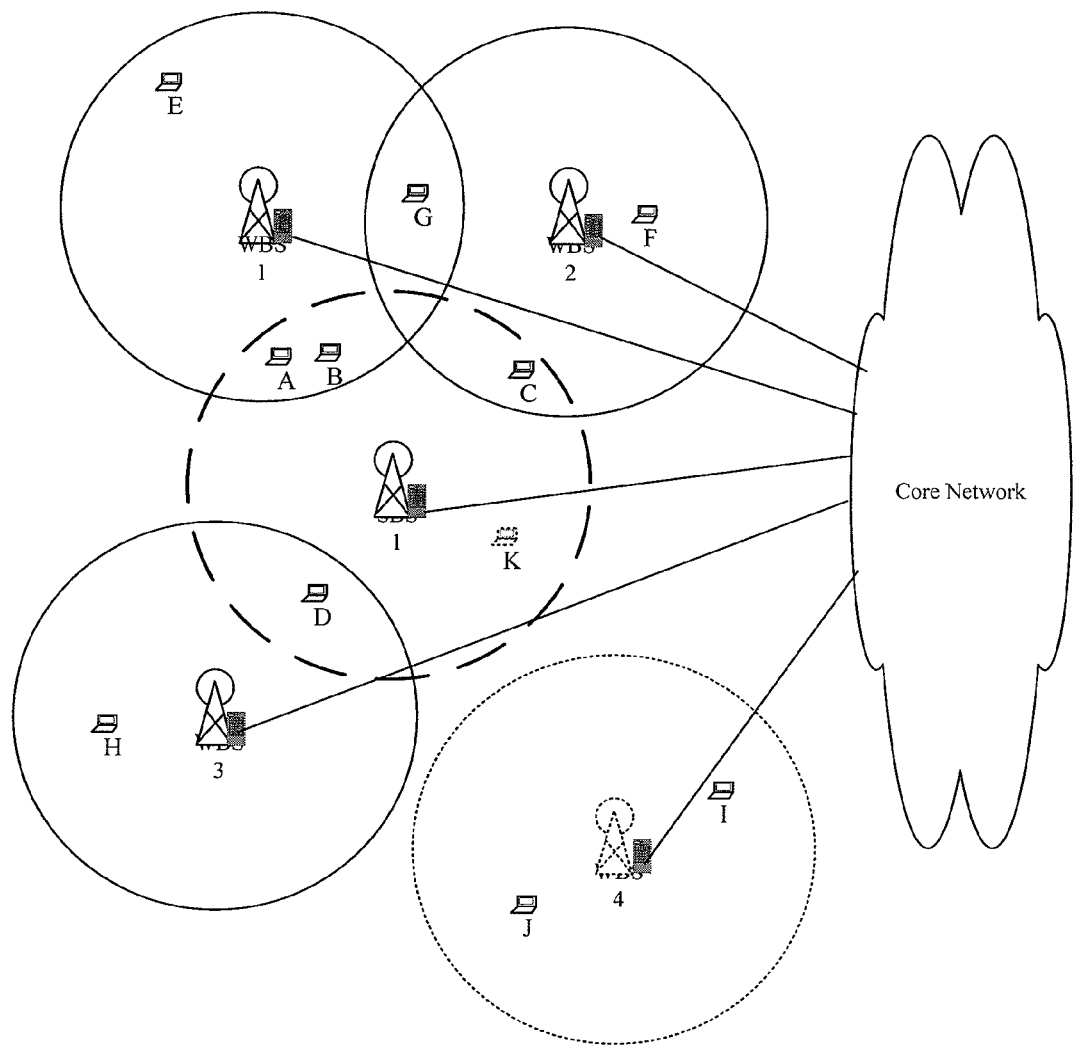
FIG. 3 is a schematic diagram of a coexistence base station network according to the present invention.
Figure 4:
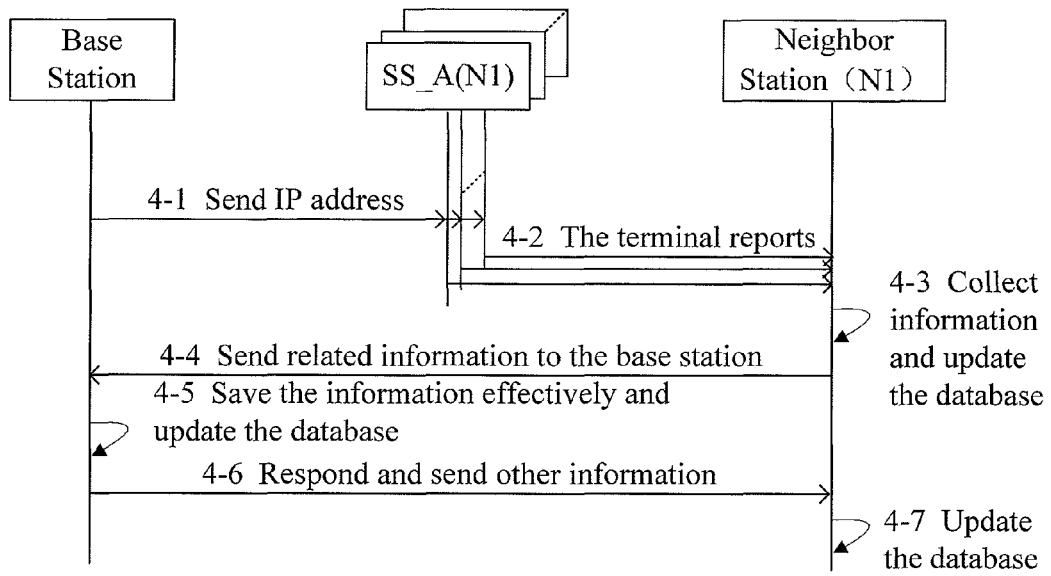
FIG. 4 is a flow chart of the method according to the present invention.

The present invention will now be described in detail in conjunction with the drawings. The specific process of the method according to the present invention is as shown in FIG. 4, including the following steps.

Step 4-1: A new SBS sends an IP address to a subscriber station.

In other words, when an SBS searches for a neighbor station, the SBS broadcasts contact information, such as IP address, via a dedicated air interface to a subscriber station of the neighbor system in the coverage area, such as subscriber station SS_A. The contact information corresponds to the SBS uniquely.

Figure 5:
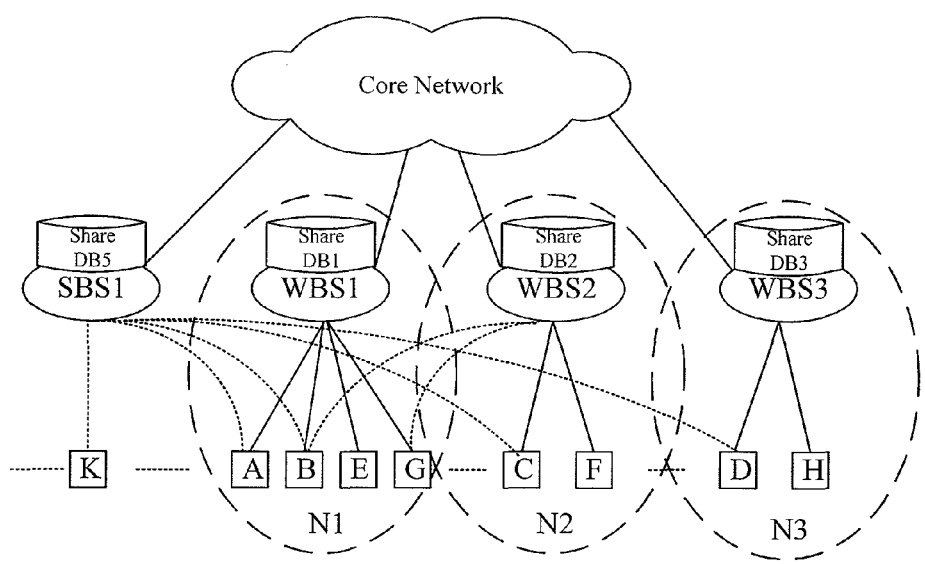
FIG. 5 is schematic diagram of the coexistence base station network according to the present invention.

For example, in the coexistence base station network shown in FIG. 5, each base station is connected via a wired network, and each base station has subscriber stations. It is assumed that WBS1 has subscriber stations A/B/E/G, WBS2 has subscriber stations C/F, WBS3 has subscriber stations D/H, and the subscriber stations of SBS1 cannot be initialized before SBS1 goes into a normal working state. Wherein, the subscriber stations corresponding to the coverage area of SBS1 are subscriber stations A/B/C/D.

When SBS1 is initialized, SBS1 broadcasts the contact information, such as IP address, via a dedicated air interface.

It should be noted that the SBS may also be referred to as an Initializing Base Station (IBS) and the WBS may also be referred to as an Operating Base Station (OBS).

Step 4-2: The subscriber station reports the contact address of the new SBS and the interference status information of the subscriber station to the base station to which the subscriber station pertains.

After a subscriber station in the neighbor system in each coverage area receives the contact information via the air interface, the subscriber station sends the received contact information, together with the identity and the interference status information of the subscriber station, to the WBS to which the subscriber station pertains.

The WBS may obtain, according to the content of the message frame reported by each subscriber station, the following information:

1. Effective wired contact information of the SBS, including the IP address of the SBS and so on;

2. Identifier (ID) information and interference status information of a reporting subscriber station, wherein the ID information may uniquely identify the Subscriber Station (SS), for example, the MAC address of the SS or other information corresponding to the SS uniquely;

3. Quantified representation for the interference status information, such as an interference level (the quantified representation may be obtained by the SS according to strength of the signal received from the SBS. This interference status information is optional).

Each of the above information may be delivered via different types of frames.

For example, in the coexistence base station network shown in FIG. 5, each of the subscriber stations A/B/C/D simultaneously receives the IP address broadcast by SBS1 via a dedicated air interface, and then each of the subscriber stations A/B/C/D respectively reports the received IP address and interference information to the base station to which the subscriber station pertains, wherein subscriber stations A and B report to WBS1, subscriber station C reports to WBS2, and subscriber station D reports to WBS3.

Step 4-3: The WBS collects and saves the information, and updates the database.

After the WBS receives the information reported by the subscriber station, the WBS needs to save the received information. Specifically, the WBS may save the reported information in a coexistence database.

The coexistence database may include the following information:

1. information related to an interfered device in a coverage area of a base station, including:

a) the ID of the interfered Subscriber Station (SS);

b) the ID of the interference source base station corresponding to the interfered SS;

c) the interfered situation of the interfered SS (for example, an interference signal strength);

d) the contact information of all interference source base stations (for example, an ID of a corresponding base station);

e) the profile information of all related interference source base stations, such as, the frame length, the working frequency range, the modulation mode, the main air interface resource information and related state information of all interference source base stations including the resource occupation, whether a negotiation is performed with the station and so on;

f) the related negotiation state information of all interference source base stations with the station, wherein the state value of the negotiation state information may be, but not limited to, Not Negotiated, In Negotiation, Negotiation Successful, Negotiation Failed and so on;

2. related information of the neighbor system interfered by the base station, including:

a) the ID of the interfered SS;

b) the ID of the neighbor system base station to which the interfered SS pertains;

c) the interfered situation of the interfered SS (for example, the interference signal strength);

d) the contact information of all interfered neighbor system base stations (IDs of corresponding base stations);

e) the profile information of all interfered neighbor system base stations, for example, the frame length, the working frequency range, the modulation mode and the radio resource allocation information.

f) the related negotiation state information of all interfered neighbor system base stations with the base station, wherein the state value of the negotiation state information may be, but not limited to, Not Negotiated, In Negotiation, Negotiation Successful, Negotiation Failed and so on.

In practice, the following two information tables may be stored in the above coexistence database:

TABLE 1

Information table of neighbor base stations in the coexistence database

| Base Station Index | IP Address | Other Information |
|---|---|---|
| 1 | XXX. XXX. XXX. XXX | ... |
| 2 | XXX. XXX. XXX. XXX | ... |
| ... | ... | ... |

TABLE 2

Information Table of subordinate subscriber stations in the coexistence database

| Subscriber station Number (such as basic CID) | Number of searched interference sources | Interference Source 1 (Index) | Interfered Strength | Interference Source 2 (Index) | Interfered Strength | ... | Other State Information |
|---|---|---|---|---|---|---|---|
| 1 | | | | | | | |
| 2 | | | | | | | |
| ... | | | | | | | |

For example, in the coexistence base station network shown in FIG. 5, data in Table 1 and Table 2 in the coexistence database of WBS1 may be as shown in Table 3 and Table 4, respectively:

TABLE 3

Example of information table of neighbor base stations in the coexistence database corresponding to WBS1

| Base Station Index | IP Address | Other Information |
|---|---|---|
| 1 (WBS2) | AAA. BBB. CCC. DDD | ... |
| 2 (SBS1) | EEE. FFF. GGG. HHH | ... |
| ... | ... | ... |

TABLE 4

Example of information table of subordinate subscriber stations in the coexistence database corresponding to WBS1

| Subscriber station Number (such as basic CID) | Number of searched interference sources | Interference Source 1 (Index) | Interfered Strength | Interference Source 2 (Index) | Interfered Strength | ... | Other State Information |
|---|---|---|---|---|---|---|---|
| 1 (Subscriber station A) | 1 | 1 (WBS2) | XXX | 2 (SBS1) | XXX | | |
| 2 (Subscriber station B) | 2 | 2 (SBS1) | XXX | 0 (Invalid) | | | |
| ... | | | | | | | |

The coexistence database in the WBS needs to be updated according to the received message reported by each subscriber station.

Step 4-4: The related information is sent to a new SBS.

The WBS saves received information reported by each subscriber station in the coexistence database. After the database is updated correspondingly, the WBS sends a contact packet to the interference source neighbor station including the new SBS in the wired or wireless mode according to the received information reported by the subscriber station.

The contact packet sent to the SBS by the WBS specifically includes:

1. the ID and contact information (IP address) of the WBS;
2. part or all of the interference status information collected by the WBS, which may be the entry or the access mode of the interference status information in the coexistence database;
3. other information needed to contact or query the coexistence database, such as security negotiation information.

Each of the above information may be delivered in a different type of message frame, respectively.

Step 4-5: The SBS effectively saves the received information, and updates the coexistence database.

After the SBS receives the information sent by the WBS via a wired network, the SBS saves the effective information, such as the ID and contact information of the WBS, and security negotiation information, in the coexistence database, and updates the coexistence database correspondingly.

Step 4-6: The SBS returns a response message carrying other information of the SBS, to the WBS.

After the SBS saves the received information, the SBS obtains the IP address of the other party from the message sent by the WBS, returns a response message including the profile information of the SBS to the WBS. The WBS updates the coexistence database and the coexistence negotiation state information carried in this process, according to a received response message.

The profile information of the SBS includes at least one of the frame length, the working frequency range, the modulation mode and the radio resource allocation information of the SBS. The state value of the negotiation state information includes, but not limited to, Not Negotiated, In Negotiation, Negotiation Successful and Negotiation Failed.

Step 4-7: The WBS updates the coexistence database.

The WBS updates the coexistence database according to the response message returned by the SBS, and then performs the subsequent corresponding processes, in other words, the WBS allocates air interface resources reasonably and adjusts the air interface resources in time.

Additionally, in the present invention, on the basis that the coexistence base station employs the above process during the starting process, when a base station which has been started changes from a non-neighbor station to a neighbor station, the process shown in FIG. 4 will also be employed. In other words, first of all, a subscriber station obtains the contact information of a coexistence base station from a message broadcast periodically by the coexistence base station; then the subsequent information interaction process may be performed, so that the coexistence database in the coexistence base station may be updated.

Figure 6:
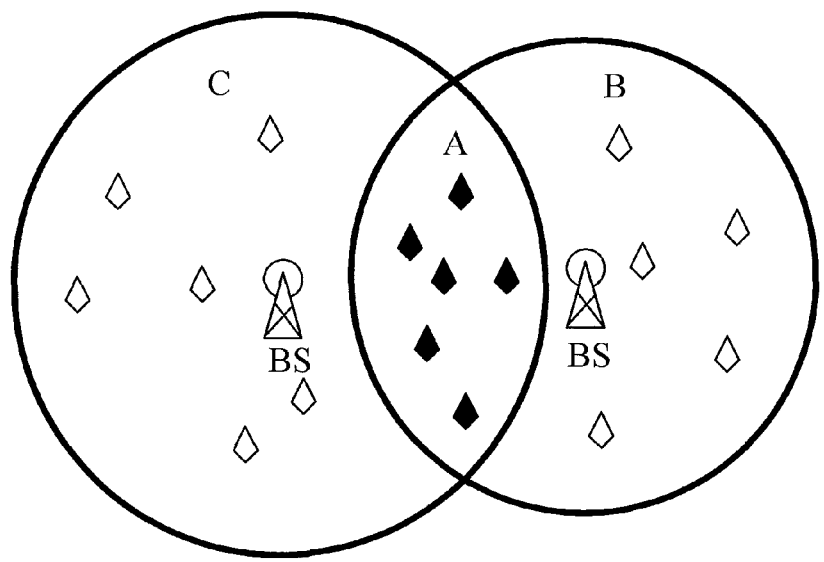
FIG. 6 is a schematic diagram showing a process in which a working base station (WBS) performs different processes according to different interference status of the subscriber station in the coverage area of the WBS.

For example, as shown in FIG. 6, the WBS performs different processes according to different interference status of the subscriber station in the coverage area of the WBS, i.e., the BS needs to distinguish the interference status of different subscriber stations, and thereby schedules the allocation of air interface resources to each subscriber station, including:

1. When the subscriber station lies in area A, because the interference exists, the subscriber station may carry out a service using dedicated resources of the base station to which the subscriber station pertains;

2. When the subscriber station lies in area B, because no interference exists, the subscriber station may carry out a service using any resources of the base station to which the subscriber station pertains.

Figure 7:
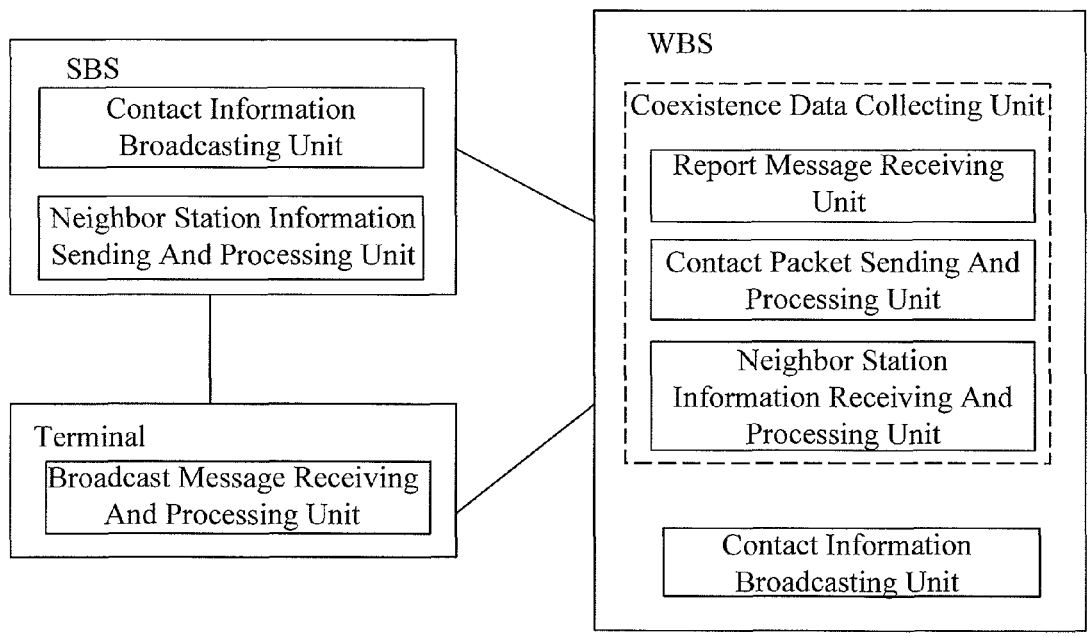
FIG. 7 is a schematic diagram showing the specific structure of the system according to the present invention.

The present invention further provides a system for collecting interference status information of a subscriber station by a coexistence base station. The specific structure of the system is shown in FIG. 7, including the following units.

1. A broadcast message receiving and processing unit

The broadcast message receiving and processing unit is configured in the subscriber station, and is adapted to receive a broadcast contact message of a neighbor station when the subscriber station lies in an overlap area of the neighbor station and trigger the interference status information to be reported.

Specifically, the process for reporting the interference status information includes: sending a report message carrying the interference status information of the subscriber station to the coexistence base station to which the subscriber station pertains. The interference status information includes: whether the subscriber station is interfered, and the ID of the corresponding interference source (such as the ID of a neighbor station) when the subscriber station is interfered.

2. A coexistence data collecting unit

The coexistence data collecting unit is configured in started coexistence base station for providing service for subscriber stations, and is adapted to collect and save the interference status information of the subscriber station according to a received report message carrying the interference status information, so that the air interface resources may be reasonably allocated and adjusted according to the corresponding interference status information.

Specifically, the coexistence data collecting unit may include:

a report message receiving unit, adapted to receive the report message carrying the interference status information, and trigger a contact packet sending and processing unit;

the contact packet sending and processing unit, adapted to send a contact packet including the contact address of the base station and the interference status information of the subscriber station collected by the base station, to an interference source neighbor station;

a neighbor station information sending and processing unit, configured in the interference source neighbor station, adapted to return a response message carrying neighbor station information after receiving the contact packet; and a neighbor station information receiving and processing unit, adapted to receive the response message returned by the interference source neighbor station, and update a coexistence database according to the neighbor station information in a received response message.

In the present invention, the coexistence base station may further include a contact information broadcasting unit adapted to broadcast the contact information of the base station in a broadcast contact message to subscriber stations in the coverage area via an air interface during the starting process or the periodic broadcasting process of the coexistence base station. The contact information broadcast by the contact information broadcasting unit includes the unique ID information of the neighbor station, and the ID information includes the IP address and the sector ID of the neighbor station.

It should be noted that in the specific realization process of the system according to the present invention, the processing units contained in a newly started coexistence base station, and the processing units contained in a started coexistence base station for providing services to subscriber stations, may also be configured in the base station.

The foregoing are only preferred embodiments of the present invention and are not for use in limiting the present invention. Any modification, equivalent replacement or improvement made under the spirit and principles of the present invention is included in the protection scope of the present invention.

What is claimed is:

1. A method for collecting interference status information of a subscriber station by a serving base station, comprising:
during an initialization process of a neighbor base station, after the subscriber station receives a broadcast contact message containing contact information including an Internet Protocol (IP) address and a sector identifier (ID) of the neighbor base station from the neighbor base station, receiving, by the serving base station, a report message from the subscriber station, wherein the report message comprises interference status information of the subscriber station, and the IP address and the sector ID of the neighbor base station, the interference status information is formed by the subscriber station in an overlapping area of the neighbor base station and the serving base station; and
collecting and saving, by the serving base station, the interference status information of the subscriber station, the IP address and the sector ID of the neighbor base station according to the report message received.

2. The method for collecting the interference status information of the subscriber station by the serving base station according to claim 1, wherein the interference status information comprises information indicating whether the subscriber station is interfered by the neighbor base station; if the subscriber station is interfered by the neighbor base station, the interference status information further comprises the identifier information of the neighbor base station.

3. The method for collecting the interference status information of the subscriber station by the serving base station according to claim 1, wherein if the subscriber station is interfered, the interference status information of the subscriber station further comprises interference level information of the subscriber station interfered by the neighbor base station, and the level information is obtained according to a signal strength of the broadcast contact message received by the subscriber station from the neighbor base station.

4. The method for collecting the interference status information of the subscriber station by the serving base station according to claim 1, wherein the process for collecting and saving the interference status information of the subscriber station comprises: according to the report message, collecting, by the serving base station, the interference status information of the subscriber station, the identifier information of the subscriber station and the contact information of the neighbor base station, and saving collected information in a coexistence database according to a correlation.

5. The method for collecting the interference status information of the subscriber station by the serving station according to claim 4, wherein the process for saving the collected information in the coexistence database according to the correlation comprises: indexing neighbor base stations collected in the coexistence database, and updating the coexistence database according to the collected information.

6. The method for collecting the interference status information of the subscriber station by the serving base station according to claim 4, further comprising: saving negotiation state information between the neighbor base station and the serving base station in the coexistence database, wherein a state value of the negotiation state information comprises Not Negotiated, In Negotiation, Negotiation Succeeded and Negotiation Failed.

7. The method for collecting the interference status information of the subscriber station by the serving base station according to claim 4, further comprising: after the serving base station collecting and saving the contact information of the neighbor base station,
sending, by the serving base station, contact packet to neighbor base station as interference sources comprising the neighbor base station after collecting and saving the contact information of the neighbor base station; and
receiving, by the serving base station, response messages from the neighbor base stations as the interference source after receiving the contact packet, and updating, by the serving base station, the coexistence database according to the response message received.

8. The method for collecting the interference status information of the subscriber station by the serving base station according to claim 7, wherein the contact packet comprises a contact address of the serving base station, and part or all of the interference status information of the subscriber station collected by the serving base station.

9. The method for collecting the interference status information of the subscriber station by the serving base station according to claim 8, wherein the part or all of the interference status information of the subscriber station collected by the serving base station is access mode information of the interference status information in the coexistence database.

10. The method for collecting the interference status information of the subscriber station by the serving base station according to claim 7, wherein the process for receiving the response messages by the serving base station comprises: receiving, by the serving base station, the response message from the neighbor base station as interference source according to the contact address in the contact packet received, the response message comprising profile information of the neighbor base station as interference source and the unique identifier information except the contact address.

11. The method for collecting the interference status information of the subscriber station by the serving base station according to claim 10, wherein the profile information of the neighbor base station comprises: a frame length, a working frequency range, a modulation mode and/or radio resource allocation information of the neighbor base station as interference source.

12. A system for collecting interference status information of a subscriber station by a serving base station, comprising:
a subscriber station and a serving base station,
wherein the subscriber station comprises a broadcast message receiving and processing unit, adapted to receive a broadcast contact message containing contact information including an Internet Protocol (IP) address and a sector identifier (ID) of the neighbor base station from a neighbor base station during an initialization process of the neighbor base station when the subscriber station lies in an overlapping area of the neighbor base station and the serving base station, and trigger a report message comprising the interference status information of the subscriber station, and the IP address and the sector ID of the neighbor base station to be sent; and
wherein the serving base station comprises a coexistence data collecting unit, adapted to receive the report message from the subscriber station, and to collect and save the interference status information of the subscriber station; the IP address and the sector ID of the neighbor base station according to the received report message.

13. The system for collecting the interference status information of the subscriber station by the serving base station according to claim 12, wherein the serving base station further comprises: a contact information broadcasting unit, adapted to broadcast contact information thereof in the broadcast contact message to a subscriber station in a coverage area of the base station via an air interface during a starting process of the serving base station or during the starting process and a periodic broadcasting process of the serving base station.

14. The system for collecting the interference status information of the subscriber station by the serving base station according to claim 12, wherein the coexistence data collecting unit comprises:
a report message receiving unit, adapted to receive the report message carrying the interference status information, and trigger a contact packet sending and processing unit;
the contact packet sending and processing unit, adapted to send a contact packet to the neighbor base station; and
a neighbor base station information receiving and processing unit, adapted to receive the response message returned by a neighbor base station information sending and processing unit in the neighbor base station, and update a coexistence database according to the response message.

15. An apparatus for collecting interference status information of a subscriber station by a serving base station, comprising:
at least one processor for receiving a report message from the subscriber station during an initialization process of a neighbor base station, wherein the report message is sent after the subscriber station receives a broadcast contact message containing contact information including an Internet Protocol (IP) address and a sector identifier (ID) of the neighbor base station from the neighbor base station, wherein the report message comprises interference status information of the subscriber station, and the IP address and the sector ID of the neighbor base station, the interference status information is formed by the subscriber station in an overlapping area of the neighbor base station and the serving base station; and for collecting and saving the interference status information of the subscriber station, the IP address and the sector ID of the neighbor base station according to the report message received.

16. An apparatus for collecting interference status information of a subscriber station by a serving base station, comprising:
at least one processor for receiving a broadcast contact message containing contact information including an Internet Protocol (IP) address and a sector identifier (ID) of the neighbor base station from a neighbor base station during an initialization process of the neighbor base station; and for sending a report message to the serving base station, wherein the report message comprises interference status information of the subscriber station, and the IP address and the sector ID of the neighbor base station, the interference status information is formed by the subscriber station in an overlapping area of the neighbor base station and the serving base station.

* * * * *

UNITED STATES PATENT AND TRADEMARK OFFICE
CERTIFICATE OF CORRECTION

PATENT NO. : 8,494,524 B2  
APPLICATION NO. : 12/040618  
DATED : July 23, 2013  
INVENTOR(S) : Xuyong Wu Page 1 of 1

It is certified that error appears in the above-identified patent and that said Letters Patent is hereby corrected as shown below:

Title Page Item (74) should read as follows:

(74) Attorney, Agent, or Firm -- Conley Rose, P.C.; Grant Rodolph

Signed and Sealed this  
Twenty-fourth Day of September, 2013

Teresa Stanek Rea  
*Deputy Director of the United States Patent and Trademark Office*